W. C. Cleveland.
Spool-Guard.
No 78577. Patented Jun. 2, 1868.
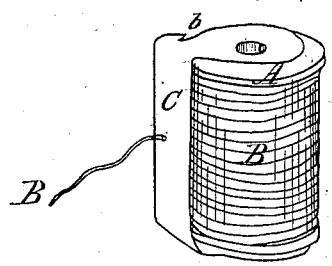
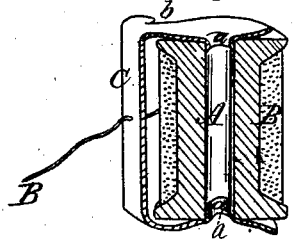
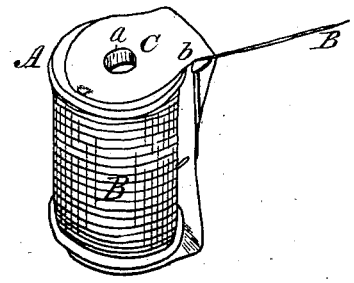
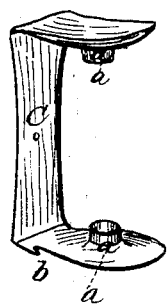
Witnesses:
Geo. W. Adams.
Charles E. Fay.
Inventor:
William C. Cleveland
By his Attorney
Chas. F. Ransbury

United States Patent Office.

WILLIAM C. CLEVELAND, OF CAMBRIDGE, MASSACHUSETTS.

Letters Patent No. 78,577, dated June 2, 1868.

IMPROVEMENT IN SPOOL-GUARDS.

The Schedule referred to in these Letters Patent and making part of the same.

TO ALL WHOM IT MAY CONCERN:

Be it known that I, WILLIAM C. CLEVELAND, of Cambridge, in the county of Middlesex, and State of Massachusetts, have invented a new and useful Spool-Guard; and I do hereby declare the following to be a full and correct description of the same, reference being had to the accompanying drawings, in which—

Figure 1 is a perspective view, showing a spool of thread to which my guard is attached.

Figure 2 is a perspective view of the guard, showing the projecting bearings upon which the spool turns as the thread is unwound.

Figure 3 is a sectional perspective view, showing the relations of the guard to the spool.

Figure 4 is a perspective view, showing in use the niche by means of which the thread may be parted when the requisite length is unreeled.

The objects of my invention are as follows, viz, first, to prevent thread from unwinding from spools unless required to do so, and allow it to do so freely when required; second, when a sufficient length has been unwound, to break or cut the thread; and third, to prevent the spool from rolling when laid down or when it falls.

The first of these objects I accomplish by making the guard, C, of a material sufficiently elastic to allow it to be sprung on to the spool, A, and then to clasp it with sufficient force to prevent it from turning on the bearings, $a$, unless required to do so.

The second object is accomplished by a niche, $b$, in the guard C, against which the thread, B, is to be drawn until it parts, the spool being held firmly that it may not turn.

The third object is attained by allowing the guard C to form an irregular projection from the spool A, which will cause it to remain quiescent when laid on an incline, and will prevent it from trundling to the opposite side of the room when it falls, instead of which it will stop where it strikes the floor, or within reach of the user.

When made of metal, I strike these guards from sheets of the material by means of dies of the various sizes required, then bend them to the required form, and bring the bearings $a$ opposite each other.

What I claim, and desire to secure by Letters Patent, is—

The spool-guard C, provided with projections $a$, so constructed as to clamp the spool between them, and to serve as axles for the spool to rotate upon, substantially as herein set forth.

The above specification of my said invention signed and witnessed at Boston, this 29th day of April, A. D. 1867.

WILLIAM C. CLEVELAND.

Witnesses:
CHAS. F. STANSBURY,
GEO. W. ADAMS.